March 3, 1953     W. BOWER ET AL     2,630,349
WHEEL ATTACHMENT
Filed Feb. 25, 1948
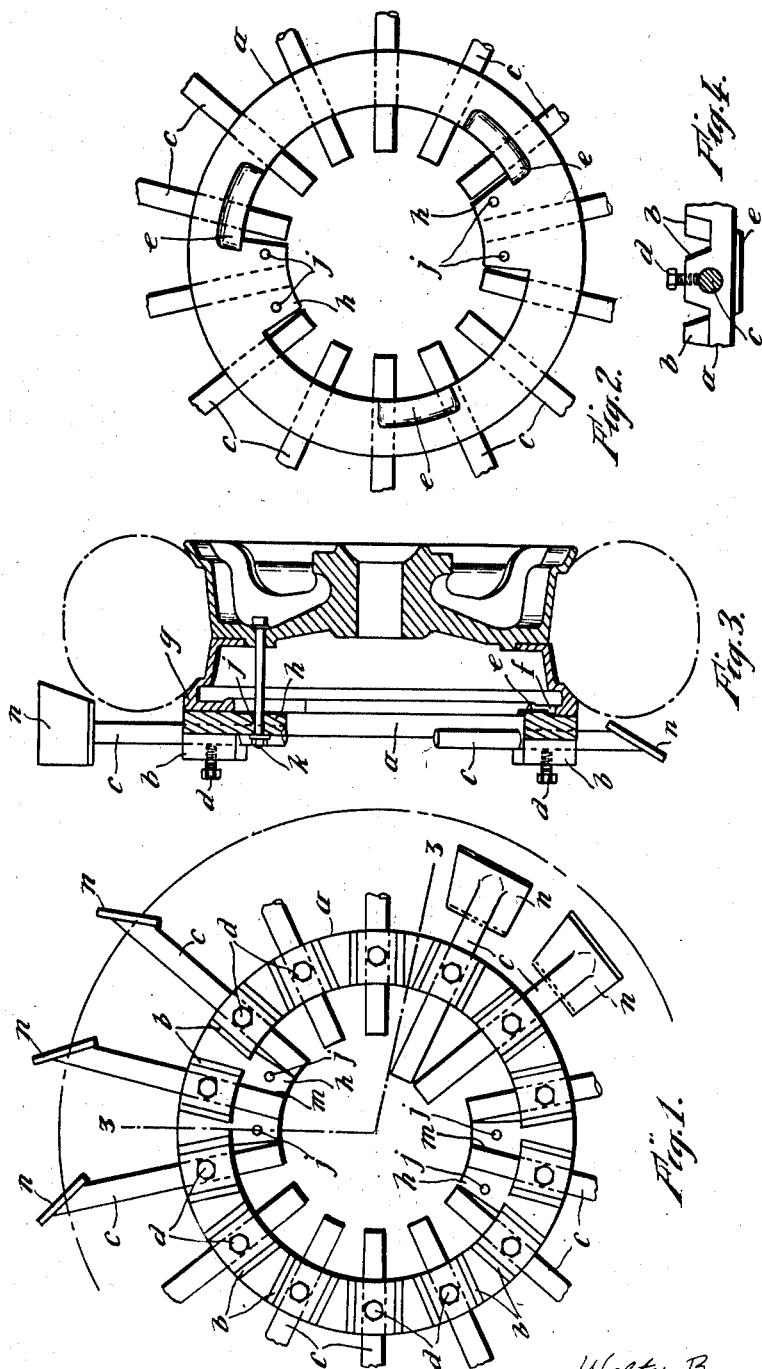

Patented Mar. 3, 1953

2,630,349

UNITED STATES PATENT OFFICE 2,630,349

WHEEL ATTACHMENT

Walter Bower and Lawrence George Ball, Barlborough, near Chesterfield, England, assignors, by direct and mesne assignments, to Renishaw Iron Company Limited, Derby, England, a British company Application February 25, 1948, Serial No. 10,856
In Great Britain January 26, 1939

Section 1, Public Law 690, August 8, 1946
Patent expires January 26, 1959

3 Claims. (Cl. 301—47)

This invention relates to a device attachable to the existing wheel of a vehicle for preventing wheel spin.

An object of the invention is to provide an improved device readily attachable to and removable from a wheel and carrying a plurality of radially disposed ground contacting sprags capable of being radially extended independently of each other for contact with the ground alongside the wheel or retracted from such contact.

A further object is to provide that the sprags have bladed outer ends and cylindrical shanks, said sprags being mounted by their shanks for turning movement upon their axes so as to position their bladed outer ends out of fouling engagement with the wheel during extension and retraction of said sprags.

A further object is to provide a simple yet robust construction of device providing ease of manual adjustment of the sprags and facilitating easy renewal thereof when necessary.

These and other objects will be apparent from the following description and reference to the accompanying drawing in which:

Fig. 1 is an elevation of one form of device made in accordance with this invention.

Fig. 2 is a rear elevation of same.

Fig. 3 is a vertical section on the line 3—3 Fig. 1 and showing the device fitted to the existing wheel of an agricultural tractor, portions of the device being omitted for clearness.

Fig. 4 is a fragmentary plan of Fig. 2.

$a$ is an annular frame or rim provided on its front radial face with a plurality of circumferentially spaced hollow bosses $b$, the interior of said bosses constituting radially disposed cylindrical guideways slidably and rotatably accommodating sprags $c$ radially of the rim $a$. The sprags $c$ extend through the guideways independently and disengagingly of one another and are adjustably held by means of set screws $d$ screw threading into the bosses $b$ with their extremities in engagement with the surfaces of the sprags $c$.

The rear radial face of the rim $a$ is provided with three laterally projecting integral lugs $e$ which are adapted to engage complementary recesses $f$ in a face of structure of the existing wheel $g$ (Fig. 3) whereby a rotary driving engagement is effected with said existing wheel $g$. Also provided on the rim $a$ and projecting radially inwards from the inner periphery thereof are two diametrically arranged integral lugs $h$ each having bolt holes $j$ for the passage of bolts $k$ securing the rim $a$ to the structure of the existing wheel $g$ as seen in Fig. 3. Each of these two lugs $h$ is grooved at $m$ in its front face to admit of the uninterrupted passage of a sprag which extends through an adjacent boss $b$.

The sprags $c$ are composed of hardened steel shanks of cylindrical form provided at their outer ends with enlargements constituting blades $n$ for entering soft ground. The sprags are, therefore, capable of slidable adjustment radially of the rim either to an extended position for contact with the ground along with the wheel or to a retracted position from contact with the ground and are also capable of adjustable turning movement, when freed by slackening off their securing screws $d$. This turning movement enables the blades $n$ to be disposed to any desired degree of angular position to the wheel track and also to free them from fouling engagement with the wheel during sliding movement of the sprags.

For use over soft or loose ground, the sprags $c$ are released by slackening the set screws $d$ and slidably advanced independently of one another to position their bladed ends $n$ in projection beyond the periphery of the existing wheel $g$ and are also turned on their axes to set their blades at requisite angles for biting into the ground alongside the wheel $g$ and prevent wheel spin thereof, thereby facilitating progress of the tractor. For use over hard ground where the sprags are not required to function, the set screws $d$ are slackened off and the sprags retracted independently of one another and turned so that their blades ends $n$ clear the side of the existing wheel as seen in the lower half of Fig. 3, the retracted position of the sprags bringing their bladed ends well within the boundary of the existing wheel and leaving the latter free to function normally.

The frame $a$ and its attached parts can be detached bodily from the existing wheel when required by removing the bolts $k$.

Should a sprag $c$ become broken or damaged so as to be ineffective for use, it can be readily removed and substituted by a new one.

What we claim and desire to secure by Letters Patent is:

1. A device for preventing wheel spin of the wheel of a vehicle comprising, an annular frame of unitary structure with means carried thereby for removably attaching said frame to the wheel in position adjacent the rim thereof and concentric with the axis of said wheel for rotation therewith, a plurality of integral hollow bosses arranged in circumferentially spaced relation on one face of the frame constituting cylindrical sprag-receiving guideways extending substantially radially of the frame at circumferential intervals thereof, a plurality of sprags each having a cylindrical shank slidably and rotatably extending within and guided by a separate one of said guideways and a ground-engaging blade which is substantially broader than the said shank and is fixedly associated with the latter outwardly of the latter's related boss and guideways therein, and a separate releasable locking member for each sprag and its related boss and guideway removably accommodated in said boss and fastenable therein into non-yielding holding engagement with the sprag for locking said sprag in various axial and angular positions of the latter relative to its related guideway against any movement relatively thereto.

2. A device for preventing wheel spin of the wheel of a vehicle comprising, an annular frame of unitary structure with means carried thereby for removably attaching said frame to the wheel in position adjacent the rim thereof and concentric with the axis of said wheel for rotation therewith, a plurality of integral hollow bosses arranged in circumferentially spaced relation on one face of the frame constituting cylindrical sprag-receiving guideways extending substantially radially of the frame at circumferential intervals thereof, a plurality of sprags each having a cylindrical shank slidably and rotatably extending within and guided by a separate one of said guideways and a ground-engaging blade which is substantially broader than the said shank and is fixedly associated with the latter outwardly of the latter's related boss and guideway therein, and a separate releasable locking screw for each sprag and its related boss and guideway screw threaded into said boss and fastenable therein into non-yielding holding engagement with the sprag for locking said sprag in various axial and angular positions of the latter relative to its related guideway against any movement relatively thereto.

3. A device for preventing wheel spin according to claim 2, the said frame having, on its face remote from the sprag-receiving guideways, a plurality circumferentially spaced laterally extending lugs adapted to make driving engagement with recesses in the face of a wheel to which the frame is fastened.

WALTER BOWER.
LAWRENCE GEORGE BALL.

REFERENCES CITED

The following references are of record in the file of this patent:

UNITED STATES PATENTS

| Number | Name | Date |
|---|---|---|
| 1,275,812 | Wilcox | Aug. 13, 1918 |
| 1,336,149 | Nelson et al. | Apr. 6, 1920 |
| 1,912,714 | Lambert | June 6, 1933 |
| 2,108,346 | Paul | Feb. 15, 1938 |

FOREIGN PATENTS

| Number | Country | Date |
|---|---|---|
| 108,705 | Australia | Oct. 26, 1939 |
| 518,805 | Great Britain | Mar. 7, 1940 |
| 196,516 | Switzerland | June 1, 1938 |